United States Patent [19]

Nelle

[11] Patent Number: 4,462,159
[45] Date of Patent: Jul. 31, 1984

[54] REFERENCE MARK SELECTION SYSTEM FOR MEASURING APPARATUS

[75] Inventor: Güenther Nelle, Bergen, Fed. Rep. of Germany

[73] Assignee: Dr. Johannes Heidenhain GmbH, Traunreut, Fed. Rep. of Germany

[21] Appl. No.: 556,586

[22] Filed: Nov. 30, 1983

[30] Foreign Application Priority Data

Dec. 11, 1982 [DE] Fed. Rep. of Germany ....... 3245914

[51] Int. Cl.³ .............................................. H01J 3/14
[52] U.S. Cl. ................. 33/125 C; 33/125 A; 356/374; 250/237 G
[58] Field of Search ............ 33/125 C, 125 R, 125 T, 33/125 A, 1 AA; 356/373, 374, 375; 250/237 G

[56] References Cited

U.S. PATENT DOCUMENTS

| | | | |
|---|---|---|---|
| 4,143,267 | 3/1979 | Johnson et al. | 33/125 A |
| 4,363,964 | 12/1982 | Schmitt | 250/237 G |
| 4,385,836 | 5/1983 | Schmitt | 356/374 |
| 4,400,890 | 8/1983 | Ohkubo et al. | 33/125 C |
| 4,403,859 | 9/1983 | Ernst | 33/125 C |

FOREIGN PATENT DOCUMENTS 2540412 8/1979 Fed. Rep. of Germany .... 33/125 C
3037810 11/1982 Fed. Rep. of Germany .... 33/125 C Primary Examiner—Willis Little
Attorney, Agent, or Firm—Willian, Brinks, Olds, Hofer, Gilson & Lione Ltd.

[57] ABSTRACT

A measuring system is described which includes a scale which defines both a measuring graduation and an array of reference marks positioned at predetermined positions with respect to the measuring graduation. The measuring system also includes a scanning unit which generates reference signals in response to detection of the reference mark. In the disclosed system a track is provided on the measuring scale which records selection indicators electrically. These selection indicators are scanned via an element of the scanning unit in order to allow selected ones of the reference marks to go into operation. Preferably, the scanning unit includes a record head for magnetically recording the selection indicators on the track, an erase head for magnetically erasing the selection indicators on the track, and a read head for magnetically detecting the selection indicators.

16 Claims, 3 Drawing Figures

REFERENCE MARK SELECTION SYSTEM FOR MEASURING APPARATUS

BACKGROUND OF THE INVENTION

The present invention relates to a reference mark selection system for a measuring apparatus of the type which comprises a measuring scale, a measuring graduation defined on the scale, a plurality of reference marks positioned at predetermined positions on the scale with respect to the graduation, and a scanning unit which includes means for generating a reference signal when the scanning unit is aligned with one of the reference marks.

In such a measuring apparatus, the reference signals can be used to generate control pulses which may be used in various ways. For example, such control pulses can be used to set a display counter to a zero position, to load a predetermined constant value into the counter at the commencement of a measurement operation, to control interference pulses, as well as for controlling devices coupled to the measuring system.

German DE-AS No. 25 40 412 discloses an incremental measuring system in which a measuring scale is provided which defines a measuring graduation. A series of reference marks are formed on the scale at a fixed spacing with respect to one another, and at least one selection element is arranged on the scale itself or in the immediate vicinity of the scale such that the selection element is slidable in a groove. The selection elements operate to select one or more reference marks which are intended to go into operation during the measuring process. The selection elements are detected by a switching means included in the scanning unit. This switching means is mounted to detect the magnetic selection elements and to generate a selection signal when the scanning unit is in alignment with one of the selection elements. This selection signal is applied as an input to a logic circuit, along with the reference signals generated by the scanning unit. This logic circuit generates a control pulse at its output only if the selection signal and the reference signal are simultaneously present on inputs of the logic circuit.

German Pat. No. 30 37 810 describes a similar incremental measuring system with reference marks provided along the graduation of the scale. In the disclosed system, appropriate ones of the reference marks are selected by means of an optoelectronic device. The selection element, which may for example take the form of a light source, is slidable in a groove of the scale carrier. The selection element can be moved into alignment with the selected reference mark. The scanning unit includes a photosensor arranged so as to detect the selection element when the scanning unit moves into alignment with the selection element. This photosensor generates a selection signal similar to that described above which enables the associated reference signal to go into operation. The positioning of the selection element in the groove in order to align the selection element with a desired reference mark may also take place by means of followers included on the scanning unit.

Such incremental measuring systems are used, for example, in processing machines to measure the relative position of two machine parts. Such machines typically generate vibration and jarrings, which can cause the selection elements to be displaced. If this happens, a clear alignment of the selection element with the selected reference mark and therefore activation of the reference mark can no longer be assured. In the event two or more reference marks are closely adjacent to one another, such displacements of the selection element may even cause the wrong reference mark to go into operation so that an erroneous control operation, for example a zeroing operation, is triggered in the counter. Such errors will typically result in erroneous measuring results. For this reason, it is important that each selection element which is shiftable in the direction of movement of the scanning unit must be fixable in place with respect to the desired reference mark. Furthermore, it is important that each selection element be fixable in a reproduceable position. Another problem encountered by the prior art is that when selection elements take the form of magnets, such magnets attract metal shavings to a strong degree which are difficult to remove. Similarly, the removal of contaminants and impurities from optical selection elements (which may take the form of light sources, mirrors or prisms) is not always readily achievable.

SUMMARY OF THE INVENTION

The present invention is directed to an improved reference mark selection system which makes possible a simple, reliable, and interference-free selection of reference marks.

According to this invention, a measuring system of the type described initially above is provided with at least one electrically applied selection indicator aligned with at least one of the reference signals. Means are provided in the scanning unit for detecting the selection indicator and for generating a selection signal in response thereto. Means are also provided for generating a control signal in response to the simultaneous generation of the reference signal and the selection signal. In a preferred embodiment described in greater detail below, the scanning unit includes a detecting element for detecting the selection indicator, a recording element for forming the selection indicator at the desired place on a selection track, and an erasing element for erasing selection indicators which are no longer desired.

The present invention provides important advantages, particularly in that separate selection elements, guide grooves for the shifting of the selection elements, and fixing elements for maintaining the selection elements in place can all be dispensed with. For this reason, a particularly economical construction is made possible. Furthermore, the present invention can be made to operate in a particularly reliable and interference-free manner to select only desired reference marks. In this way, the operating security of the measuring system and of the machine connected with it can be improved in an important way. Contaminations can also be removed in a simple manner. Further advantageous features of the invention are set forth in the dependent claims attached hereto.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
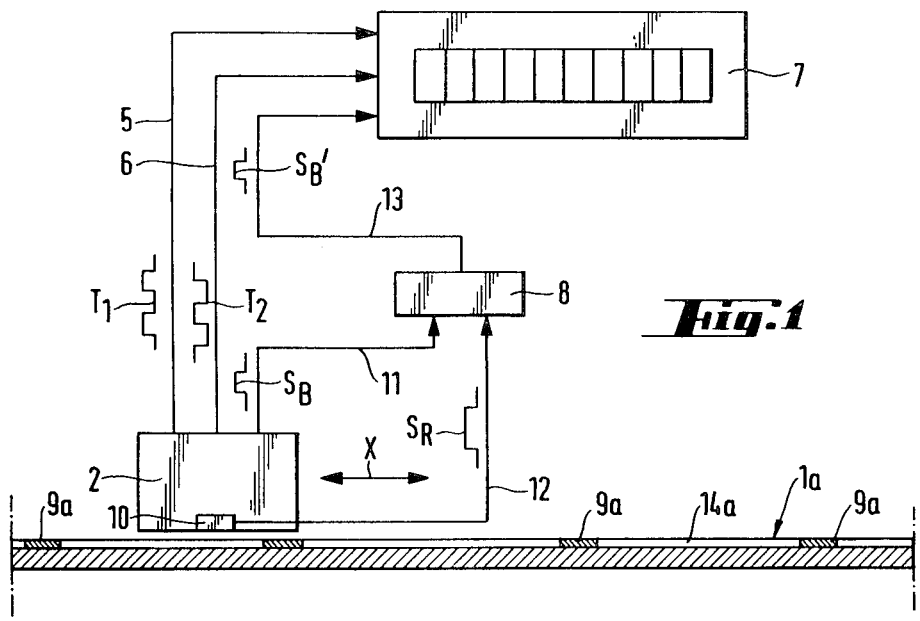
FIG. 1 shows a schematic representation of an incremental length measuring arrangement which incorporates a first preferred embodiment of this invention.
Figure 2:
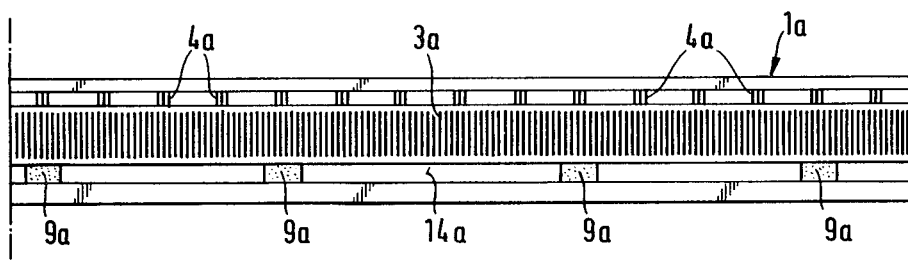
FIG. 2 is a plan view of a first measuring scale suitable for use in the measuring arrangement of FIG. 1.

Turning now to the drawings, FIG. 1 is a schematic representation of a photoelectric, incremental, length measuring system. This system includes a measuring scale 1a and a scanning unit 2. The scale 1a and the scanning unit 2 are connected with objects (not shown) such as portions of a processing machine, the position of which is to be measured. As shown in FIG. 2, the scale 1a serves as a carrier for a measuring graduation 3a which takes the form of a line grid in this embodiment. The scanning unit 2 of this embodiment operates to scan the graduation 3a in direct light illumination, photoelectrically, without direct contact between the scanning unit 2 and the graduation 3a. A series of equidistant reference marks 4a are placed on the scale 1a alongside the graduation 3a. Each of the reference marks 4a is made up of a line group having a predetermined line distribution, and all of the reference marks 4a are characterized by the same line distribution.

The scanning unit 2 operates to generate periodic scanning signals as the scanning unit 2 moves along the measuring graduation 3a. These scanning signals are amplified in the scanning unit 2 and are converted into square wave signals $T_1$, $T_2$. The square wave signals $T_1, T_2$ are applied via electrical conductors 5,6 to an electronic counter 7 which displays the measuring value derived from the square wave signals $T_1, T_2$ in digital form. In this embodiment the square wave signals $T_1, T_2$ are phase-shifted with respect to one another by a quarter of the grid constant of the graduation 3a in order to allow the scanning direction to be determined. The scanning unit 2 also includes means for detecting the reference marks 4a and for generating a square wave reference signal $S_B$ in response thereto. The reference signal $S_B$ is applied via an electrical conductor 11 to a logic circuit 8.

According to this invention, a selection track 14a of a magnetizable material is provided on the scale 1a alongside the reference marks 4a, as shown in FIG. 2. The selection track 14a operates to record magnetic selection indicators 9a, each of which is aligned with a respective one of the reference marks 4a. The selection indicators 9a are scanned by an element 10 of the scanning unit 2 in order to enable only selected ones of the reference marks 4a to be brought into operation during the measuring process. When the scanning unit 2 approaches a selected one of the reference marks 4a, the magnetic selection indicator 9a on the selection track 14a is detected by the element 10, which may for example take the form of a magnetic field plate or a Hall effect sensor. The element 10 generates a selection signal $S_R$ in response to detection of one of the selection indicators 9a. This selection signal $S_R$ is applied via an electrical conductor 12 to the logic circuit 8. The logic circuit 8 operates to generate a control signal $S_B'$ on its output line 13 only in the event the reference signal $S_B$ and the selection signal $S_R$ are received simultaneously on inputs of the logic circuit 8. The control signal $S_B'$ is applied via the conductor 13 to the electronic counter 7. The electronic counter 7 is programmed to respond to the control signal $S_B'$ in a suitable manner, as for example by setting the numerical display to the value zero. In the embodiment of FIG. 2, the selection track 14a is formed as a magnetizable metal layer applied directly to the scale 1a.

Figure 3:
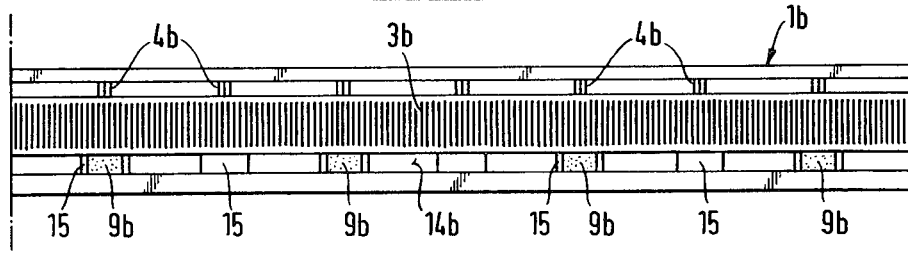
FIG. 3 is a plan view of a second scale suitable for use with the embodiment of FIG. 1.

FIG. 3 shows a plan view of a second embodiment of a scale 1b suitable for use in the measuring system of FIG. 1. As shown in FIG. 3, a foil 14b is mounted on the scale 1b to form the selection track. This foil 14b is provided with an array of magnetizable fields 15 which are aligned in each case with a respective one of the reference marks 4b.

Each of the magnetizable fields 15 may serve to record a magnetic selection indicator 9b. The scanning unit 2 includes an element 10 similar to the one described above which operates to scan the foil 14b and to generate the selection signal $S_R$ in response to detection of one of the magnetic selection indicators 9b. In this way, the selected ones of the reference marks 4b are brought into operation during the measuring process.

Preferably, the selection indicators 9a,9b for the selected ones of the reference marks 4a,4b are recorded by means of the element 10 of the scanning unit 2 on the selection track 14a,14b. Furthermore, in this preferred embodiment selection indicators 9a,9b which are no longer needed (due to a reassignment of the selected ones of the reference marks 4a,4b) may be erased from the track 14a,14b by the element 10. For these purposes, the element 10 of the scanning unit 2 includes a magnetic head which incorporates a recording element, an erasing element, and a reading element. The recording element operates to record the magnetic selection indicators 9a,9b on the selection tracks 14a,14b; the erasing element operates to erase the magnetic selection indicators 9a,9b from the selection track 14a,14b, and the reading element operates to generate the selection signal $S_R$ in response to the presence of the magnetic selection indicators 9a,9b. When it is desired to record or generate a selection indicator 9a,9b in alignment with a selected one of the reference marks 4a,4b, the scanning unit 2 is moved to the selected reference mark 4a,4b. When the associated reference signal $S_B$ is generated by the scanning unit 2, the recording element of the element 10 is controlled so as to record the selection indicator 9a,9b on the track 14a,14b. In a similar manner a no-longer-needed selection indicator 9a,9b on the track 14a,14b can be erased by means of the erasing element. The recording and the erasing of selection indicators 9a,9b on the track 14a,14b can thus take place under program control. For example, the processing program of a numerically controlled processing machine on which the measuring system is used may actually operate to record selection indicators 9a,9b in appropriate positions. Of course, the recording and erasing of selection indicators 9a,9b on the track 14a,14b can also be accomplished manually in any suitable manner.

In another embodiment of this invention, the scale may itself be made of a magnetizable material, such as steel. When this is done, the selection indicators may be recorded directly on the scale. Furthermore, selection indicators may also be recorded on a track capacitively or inductively.

Of course, it should be understood that a wide range of changes and modifications can be made to the preferred embodiments described above. For example, this invention can be used in a similar manner in conjunction with absolute measuring systems of the type which include incremental tracks. Furthermore, this invention is not restricted to use with photoelectric measuring systems, but may also be used advantageously in magnetic, inductive, and capacitive measuring systems. It is therefore intended that the foregoing detailed description be regarded as illustrative rather than limiting, and that it be understood that it is the following claims, including all equivalents, which are intended to define the scope of this invention.

I claim:

1. In a measuring system which comprises a measuring scale, a measuring graduation defined on the scale, a plurality of reference marks positioned at predetermined positions on the scale with respect to the graduation, and a scanning unit which includes means for generating a reference signal when the scanning unit is aligned with one of the reference marks, the improvement comprising:
at least one electrically applied selection indicator aligned with at least one of the reference marks;
means, included in the scanning unit, for detecting the selection indicator and for generating a selection signal in response thereto; and
means for generating a control signal in response to the simultaneous generation of the reference signal and the selection signal.

2. The invention of claim 1 wherein the scanning unit further comprises:
means for electrically generating the selection indicator at a selected position on a selection track; and
means for electrically erasing the selection indicator.

3. The invention of claim 1 further comprising a selection track which includes a series of fields, each aligned with a respective one of the reference marks, and each of the fields adapted to store one of the selection indicators.

4. The invention of claim 1 wherein the selection indicator is magnetically recorded on a magnetically responsive selection track.

5. The invention of claim 4 wherein the selection track comprises a magnetizable layer.

6. The invention of claim 4 wherein the selection track comprises a magnetizable foil.

7. The invention of claim 1 wherein the scale is formed of a magnetizable material, and wherein the selection indicator comprises a magnetized region of the scale.

8. The invention of claim 2 wherein the means for detecting the selection indicator means comprises a magnetic reading element, wherein the means for generating the selection indicator comprises a magnetic recording element, and wherein the means for erasing the selection indicator comprises a magnetic erasing element.

9. The invention of claim 8 wherein the reading element comprises a Hall element.

10. The invention of claim 8 wherein the reading element comprises a field plate.

11. The invention of claim 3 wherein the selection indicator is capacitively recorded on the selection track.

12. The invention of claim 3 wherein the selection indicator is inductively recorded on the selection track.

13. In a measuring system which comprises a measuring scale, a measuring graduation defined on the scale, a plurality of reference marks positioned at predetermined positions on the scale with respect to the graduation, and a scanning unit which includes means for generating a reference signal when the scanning unit is aligned with one of the reference marks, the improvement comprising:
a selection track on the measuring scale extending parallel to the array of reference marks said selection track comprising a magnetizable material;
a selectively activated magnetic recording element mounted on the scanning unit to scan the selection track, said recording element operative when activated to record at least one selection indicator on the selection track in alignment with a selected one of the reference marks;
a magnetic reading element mounted on the scanning unit to scan the selection track, said reading element operative to detect the selection indicator and to generate a selection signal in response thereto;
a selectively activated magnetic erasing element mounted on the scanning unit to scan the selection track, said erasing element operative when activated to erase the selection indicator from the selection track; and
means for generating a control signal in response to the simultaneous generation of the reference signal and the selection signal.

14. The invention of claim 13 wherein the magnetizable material comprises a layer deposited on the scale.

15. The invention of claim 13 wherein the magnetizable material comprises a magnetizable foil secured to the scale.

16. The invention of claim 13 wherein the scale is formed of a magnetizable material and wherein the selection track is integral with the scale.

* * * * *